United States Patent [19]

Kanda et al.

[11] Patent Number: 4,869,796
[45] Date of Patent: Sep. 26, 1989

[54] ELECTRODEPOSITION COATING COMPOSITION

[75] Inventors: Kazunori Kanda, Yao; Hisaichi Muramoto, Hirakata; Koichi Saito, Kyoto; Shinichi Ishikura, Tsuzuki, all of Japan

[73] Assignee: Nippon Paint Co., Ltd., Osaka, Japan

[21] Appl. No.: 81,782

[22] Filed: Aug. 5, 1987

[30] Foreign Application Priority Data

Aug. 6, 1986 [JP] Japan ................. 61-185849

[51] Int. Cl.$^4$ ............................ C25D 13/06
[52] U.S. Cl. ..................... 204/181.6; 204/181.7; 524/901; 524/522; 524/512; 524/513; 524/517; 525/123; 525/125; 525/162; 523/411; 523/412; 523/413
[58] Field of Search ............ 204/181.7, 181.6; 524/901, 522, 512, 513, 517; 525/123, 125, 162; 523/411-413

[56] References Cited

U.S. PATENT DOCUMENTS

| | | | |
|---|---|---|---|
| 4,322,324 | 3/1982 | Mizuguchi | 528/290 |
| 4,379,872 | 4/1983 | Ishikura | 523/406 |
| 4,416,753 | 11/1983 | Batzill | 204/181.7 |
| 4,468,493 | 8/1984 | Ishikura | 524/522 |
| 4,476,261 | 10/1984 | Patzschke | 204/181.6 |

Primary Examiner—John F. Niebling
Assistant Examiner—Ben C. Hsing
Attorney, Agent, or Firm—Millen, White & Zelano

[57] ABSTRACT

An electrodeposition coating composition comprising (a) a water-dispersible, electrically depositable binder resin and (b) water-insoluble, internally crosslinked polymer microparticles having a particle size from 0.01 to 2 microns, said polymer microparticles bearing on their surfaces physically adhered or covalently bound thereto an amphoionic group of the formula:

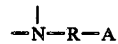

wherein R represents an unsubstituted or substituted $C_1$-$C_6$ alkylene or phenylene, A is —COOH or —SO$_3$H.

16 Claims, No Drawings

ELECTRODEPOSITION COATING COMPOSITION

BACKGROUND OF THE INVENTION

Electrodeposition coating processes have been a widely used for applying anti-corrosive primer coatings to various metallic substrates such as automobile bodies because they are applicable to a variety of substrates regardless of shape or configuration and also hazardless to attendant workers and to the environment. Coating compositions used in the electrodeposition processes are in the form of an aqueous solution or dispersion of electrically charged resin particles. Accordingly, their stability and throwing power are important for the consistent operation of an electrodeposition coating line. With regard to finished coating films, it is desirable to have a large film thickness and high performance properties in such a field as automobile painting where a high corrosion and chipping resistance is essential. Furthermore, there is ever growing needs among users for coated articles having a highly aethetic appearance in terms of sharpness and gloss.

It is known to incorporate internally crosslinked polymer microparticles into electrodeposition coating compositions. Japanese Laid Open Patent Application 8-93762 discloses an electrodeposition coating composition containing an emulsion of internally crosslinked copolymers of a polyfunctional monomer and a monofunctional monomer dispersed in a solution of a water-soluble thermosetting resin. This composition gives a coating film having a irregular surface due to the presence of polymer microparticles embedded therein so that irregular reflection takes place on the surface to give a mat finish. Obviously, it is not intended that the resulting film to be provided thereon with further coatings such as middle and/or top coatings. A similar coating composition based on the same principle for decorating aluminum or aluminum alloy substrates with a mat finish is also disclosed in Japanese Laid Open Patent Application 56-49766.

These known compositions have certain disadvantages in that they have a limited use only for imparting a mat finish on a glaring surface and are not adapted for universal uses. The polymer microparticles in the liquid composition tend to settle upon storage and have an adverse effect on the electrodeposition operation when added in amounts sufficient to give a satisfactory mat effect.

SUMMARY OF THE INVENTION

It a main object of this invention to provide an electrodeposition coating composition containing polymer microparticles which can meet all or most of the above-mentioned requirements without adversely affecting the stability and workability of the composition. Other advantages and objects of this invention will become apparent to those skilled in the art as the description proceeds.

According to this invention, there is provided an electrodeposition coating composition comprising:

(a) an aqueous dispersion of a water-dispersible, electrically depositable binder resin, and (b) 0.1 to 120 parts by weight per 100 parts by weight of said electrically depositable resin of water-insoluble, internally crosslinked polymer microparticles uniformly dispersed in said aqueous dispersion, said polymer microparticles having a particle size from 0.01 to 2 microns and bearing on their surfaces either physically adhered or covalently bound thereto, an amphoionic group of the formula:

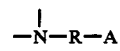

wherein R represents an unsubstituted or substituted $C_1$-$C_6$ alkylene or phenylene, and A represents —COOH or —$SO_3H$.

Preferably, for the polymer microparticles to bear an additional ionic group having the same polarity as that of the electrically depositable resin.

By incorporating polymer microparticles having the aforesaid amphoionic group to the coating composition, it is possible to increase throwing power and film thickness per application thereby enhancing the properties of resulting cured film including impact strength, adhesion to substrate and corrosion resistance. These advantageous effects are realized by the amphoionic groups carried by the polymer microparticles. Since the amphoionic group is highly hydrophilic, the addition of polymer microparticles bearing such group to an electrodeposition coating composition serves to assist stable dispersion of the binder resin and thus the storage stability of the entire composition may be increased.

Since the amphoionic groups are bound to the surfaces of polymer microparticles and remain unaffected when the binder resin is neutralized and deposited on a substrate by electrolysis, it is postulated that an amount of water remaining in the surrounding resin matrix is adsorbed on the surfaces of the polymer microparticles. In fact the presence of the amphoionic group-bearing microparticles results in an increase of the film resistivity and the Coulomb efficiency. This will support the ability possessed by the amphoionic groups of controlling the state of water present in the electrically deposited coating film. When a middle and/or top coating are given on the electrodeposition coating film, a sharp and glossy appearance is obtained.

DETAILED DISCUSSION

Water-Dispersible, Electrically Depositable Resins

This invention is applicable to both anodic and cathodic electrodeposition coating compositions. A wide variety of water-dispersible resins are known for both the anodic and cathodic electrodeposition coating processes and may be used in this invention.

Water-dispersible resins used in the anodic electrodeposition coating process must have an anionic functional group such as carboxyl group for imparting the resin with negative charges and for rendering the resin hydrophilic.

A variety of such resins are known including acrylic, polyester, polyether, phenolic, epoxy, polyurethane, polyamide, polybutadiene and oil based resins. Typical examples thereof are acrylic copolymers containing acrylic or methacrylic acid, maleinized natural and synthetic drying oils, maleinized polybutadiene, half esters and half amides of maleinized oils and polymers.

Water-dispersible resins used in the cathodic electrodeposition coating process have a cationic functional group such as primary, secondary or tertiary amine moiety as a positively chargeable hydrophilic group. A variety of such resins are known including epoxy, polyether, polyester, polyurethane, polyamide, polybutadiene, phenolic and acrylic resins.

According to the curing mechanism of particular resins, they may be classified into three classes. The first class of resins are capable of self-crosslinking through a radical or oxidative polymerization reaction. The second class of resins requires a crosslinking agent such as melamine resins or blocked polyisocyanates. The third class utilizes both the self-crosslinking reaction and the crosslinking agent in combination.

According to the type of energy source required for initiating the crosslinking reaction, the water-dispersible, chargeable resins may also be classified into the ambient temperature curing, heat-curing and radiation e.g., UV or electron beam, curing types.

The water-dispersible resins must be hydrophilic such that they are not soluble or dispersible in water when they are in the form of a free acid or free base, but become soluble or dispersible to make a stable aqueous solution or dispersion when at least 20% of the acid or base function is neutralized. If the water-dispersible resins are too hydrophilic, they fail to form a coating film having satisfactory water- or corrosion resistance and/or the application of electrodeposition coating processes become impossible.

In order to enhance various film properties, the water-dispersible resins are often used in the form of an emulsion in which said water-dispersible resin constitutes a continuous phase and a water-insoluble resin free from chargeable hydrophilic groups such as epoxy acrylate resin constitutes a dispersed phase.

The term "electrically depositable, water-dispersible resins" as used herein includes all of the aforesaid resins and resin mixtures. Further details of electrically depositable resins are well-known to those skilled in the art and thus need not be discussed herein.

POLYMER MICROPARTICLES BEARING AMPHOIONIC GROUPS

Several methods are known for preparing the polymer microparticles. One method includes the steps of emulsion or suspension polymerizing a mixture of ethylenically unsaturated monomers in an aqueous medium, and removing water from the emulsion by means of solvent substitution, azeotropic distillation, centrifugation, drying and the like.

Another method commonly referred to as the non-aqueous dispersion (NAD) method or precipitation polymerization method comprises polymerizing a mixture of ethylenically unsaturated monomers in a non-aqueous organic liquid such as aliphatic hydrocarbons having low solubility parameters or those solvents having high solubility parameters in which the monomer mixture is soluble but the polymer is insoluble to form a non-aqueous dispersion of the polymeric microparticles.

The polymeric microparticles used in the present invention may be prepared by any of these known methods.

At least a portion of the starting monomer mixture is a monomer having at least two polymerizable sites per molecule or a combination of two monomers having mutually reactive groups to give microparticles which are internally cross-linked.

Examples of ethylenically unsaturated comonomers used for the production of microparticles include methyl (meth)acrylate, ethyl (meth)acrylate, n-butyl (meth)acrylate, isobutyl (meth)acrylate, 2-ethylhexyl (meth)acrylate, styrene, α-methylstyrene, vinyltoluene, t-butylstyrene, ethylene, propylene, vinyl acetate, vinyl propionate, acrylonitrile, methacrylonitrile, dimethylaminoethyl (meth)acrylate and the like. Two or more comonomers may be combined.

Cross-linking comonomers include a monomer having at least two ethylenically unsaturated bonds per molecule and the combination of two different monomers having mutually reactive groups.

Monomers having at least two polymerization sites may typically be represented by esters of a polyhydric alcohol with an ethylenically unsaturated monocarboxylic acid, esters of an ethylenically unsaturated monoalcohol with a polycarboxylic acid and aromatic compounds having at least two vinyl substituents. Specific examples thereof include ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetracrylate, pentaerythritol dimethacrylate, pentaerythritol trimethacrylate, pentaerythritol tetramethacrylate, glycerol diacrylate, glycerol allyloxy dimethacrylate, 1,1,1-tris(hydroxymethyl)ethane diacrylate, 1,1,1-tris(hydroxymethyl)ethane triacrylate, 1,1,1-tris(hydroxymethyl)ethane dimethacrylate, 1,1,1-tris(hydroxymethyl)ethane trimethacrylate, 1,1,1-tris(hydroxymethyl)propane diacrylate, 1,1,1-tris(hydroxymethyl)propane dimethacrylate, 1,1,1-tris(hydroxymethyl)propane trimethacrylate, triallyl cyanurate, triallyl isocyanurate, triallyl trimellitate, diallyl phthalate, diallyl terephthalate and divinyl benzene.

Combinations of two monomers having mutually reactive groups may be used in place of, or in addition to monomers having two or more polymerization sites. For example, monomers having a glycidyl group such as glycidyl acrylate or methacrylate may be combined with carboxyl group-containing monomers such as acrylic, methacrylic or crotonic acid. Also, hydroxyl group-containing monomers such as 2-hydroxyethyl (meth)acrylate, 2-hydroxypropyl (meth)acrylate, hydroxybutyl (meth)acrylate, allyl alcohol or methallyl alcohol may be combined with isocyanato group-containing monomers such as vinyl isocyanate or isopropenyl isocyanate.

Polymer microparticle prepared from the combination of two monomers having mutually reactive groups are recovered by such conventional means as filtration, spray drying or lyophilization and then subjected to internally crosslinking by heating them optionally in the presence of a catalyst.

Polymer microparticles prepared from the mixture of monofunctional and polyfunctional monomers in an aqueous or nonaqueous medium may be isolated in a similar manner and used directly without heating or after milling to a suitable particle size. Alternatively, the dispersion containing the polymer microparticles may be subjected to solvent substitution and the resulting suspension in a new medium may be incorporated in the composition of this invention.

The average size or diameter of the polymer microparticles may be controlled by selecting an appropriate polymerization method. The emulsion polymerization and NAD method are suited for 0.01 to 0.6 micron range while the precipitation polymerization method is suited for 0.2 to 2 micron range.

The polymer microparticles preferably consist of 1 to 100% by weight of monomers having at least two polymerizable sites per molecule or a combination of two monomers having mutually reactive groups and 0 to 99% by weight of ethylenically unsaturated monofunctional monomers.

The polymer microparticles used in this invention must bear on their surfaces an amphoionic group of the formula:

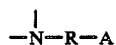

wherein all symbols are as defined above. One of methods for producing such polymer microparticles comprises polymerizing monomer mixtures constituting the polymer microparticles by the emulsion, NAD or precipitation method in the presence of a surfactant, monomer, oligomer or polymer containing the above amphoionic group. When the polymerizable monomer or oligomer is used the amphoionic group is covalently bound to the polymer microparticles as a comonomer thereof. Another method comprises coating the polymer microparticles free of the amphoionic group with the oligomer or polymer containing the amphoionic group.

Several types of amphoionic surfactants are known including the carboxylate, sulfate ester, sulfonate ester and phosphate ester types. Lauryldimethyl betaine, stearyldimethyl betaine and laurylhydroxyethyl betaine are specific examples which are widely known and used.

Other examples of usable amphoionic surfactants include 1-(3-sulfo-2-hydroxypropyl)pyridinium betaine, 1-(3-sulfopropyl)pyridinium betaine, lauryldimethylammonium-3-sulfopropyl betaine, myristyldimethylammonium-3-sulfopropyl betaine, stearyldimethylammonium-3-sulfopropyl betaine, palmityldimethylammonium-3-sulfopropyl betaine and alkylamidopropyldimethylammonium-3-sulfopropyl betaine. These surfactants are sold by Rachig.

Further examples include N-(2-hydroxydodecyl)-2-aminoethanesulfonic acid, N-(2-hydroxytriacontyl)-2-aminoethanesulfonic acid, N-methyl-N-(2-hydroxydodecyl)-2-aminoethanesulfonic acid, N-[2-hydroxy-3-(α-oxydodecyloxy)propyl]-2-aminoethanesulfonic acid and laurylaminopropionic acid. These amphoionic compounds are sold by Nippon Paint Co., Ltd.

Examples of amphoionic group-containing polymerizable monomers include those having the formula:

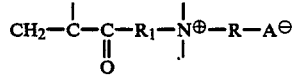

wherein $R_1$ is an alkylene group, R and A are as defined above, such as N-(3-sulfopropyl)-N-methacryloyloxyethyl-N,N-dimethyl betaine, or those having the formula:

such as 1-(3-sulfopropyl)-2-vinylpyridinium betaine.

Further examples include a polymerizable amino acid disclosed in Japanese Laid Open Patent Application 56-24461 having the formula:

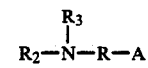

wherein $R_2$ is a substituent having a polymerizable ethylenic unsaturation, $R_3$ is a hydrogen atom or a substituted or unsubstituted $C_1$-$C_{30}$ hydrocarbon residue, R and A are as defined above.

A typical example of the compounds of this class is N-methyl-N-(vinylbenzyl)taurine.

The polymer microparticles containing, as a part of comonomer thereof, the aforesaid polymerizable amphoionic monomer are disclosed in U.S. Pat. No. 4,468,493 to Ishikura et al, assigned to the assignee of this application, whose disclosure is incorporated herein by reference.

Oligomers having the amphoionic group are exemplified by the oil-free polyester or alkyd resins disclosed in U.S. Pat. No. 4,322,324 and the amphoteric amino sulfonate derivatives of epoxy resins disclosed in U.S. Pat. No. 4,379,872. Acrylic oligomers derived from the aforesaid polymerizable amphoionic monomer may also be used.

Polymers having the amphoionic group are composed the same as the above oligomers but have higher molecular weights.

It is preferable for the polymer microparticles used in the present invention to bear on their surfaces an additional ionic group having the same polarity as that of the binder resin to be combined i.e. an anionic group such as carboxylic or sulfonic acid group for anodic electrode-position and a cationic group such as amino group for cathodic electrodeposition. This may be effected by incorporating a monomer having both ethylenic unsaturation and carboxyl group such as acrylic or methacrylic acid, or a monomer having both ethylenic unsaturation and a basic group such as dimethylaminoethyl (meth)acrylate or vinylpyridines to the monomer mixture constituting the polymer microparticles. Alternatively, the anionic or cathionic group may be given to the polymer microparticles by using a polymerization initiator which gives the acid or base terminal when polymerizing the monomer mixture.

ELECTRODEPOSITION COATING COMPOSITION

The electrodeposition composition of this invention comprises, as essential components, the aforesaid electrically depositable binder resin and the polymer microparticles The proportion of the polymer microparticles ranges from 0.1 to 120 parts by weight per 100 parts by weight of the binder resin on solid basis. If this proportion is too low, the effect of polymer microparticles can not be expected. Conversely, excessive addition of the microparticles tend to affect the storage stability and workability of the composition of this invention.

The coating composition of this invention may contain an auxiliary curing agent such as melamine resin, benzoguanamine resin, phenol resin or blocked polyisocyanate compounds, or a metallic dryer compound such as manganese, cobalt, copper or lead compounds.

These components are uniformly dispersed in an aqueous medium containing a base in case of the anodic electrodeposition or an acid in case of the cathodic electrodeposition in an amount sufficient to neutralize at least 20% of the binder resin.

Examples of bases include ammonia, diethanolamine, triethanolamine, methylethanolamine, diethylamine, morpholine, and potassium hydroxide. Examples of acids include phosphoric acid, acetic acid, propionic acid and lactic acid.

The aqueous medium is water or a mixture of water and a water-miscible organic solvent such as ethylcellosolve, propylcellosolve, butylcellosolve, ethyleneglycol dimethyl ether, diacetone alcohol, 4-methoxy-4-methylpentanone-2 or methyl ethyl ketone. A small amount of a water-immiscible organic solvent such as xylene, toluene, methyl isobutyl ketone or 2-ethylhexanol may be added to the mixture of water and the water-miscible organic solvent.

The electrodeposition coating composition of this invention may further contain conventional pigments such as titanium dioxide, ferric oxide, carbon black, aluminum silicate, precipitated barium sulfate, aluminum phosphomolybdate, strontium chromate, basic lead silicate or lead chromate.

The electrodeposition coating composition must have an electroconductivity from 0.1 to 5 mS/cm, preferably from 0.5 to 3 mS/cm. When this value is too low, it is difficult to obtain a film thickness having desired protective and other functions. Conversely, if the composition is too conductive, problems such as the dissolution of substrate or counter electrode in the bath, uneven film thickness or poor water- or corrosion resistance will arise.

The electrodeposition coating composition of this invention may be applied on a conductive substrate by the electrodeposition coating process at a nonvolatile content of 10 to 20% by weight to a dry film thickness of 15 to 50 microns. After applying, the resulting coating film may be cured at ambient or an elevated temperature, or by irradiating with UV or electron beam depending upon the nature of particular binder resins.

The invention is further illustrated by the following examples in which all parts and percents are by weight unless otherwise specified.

EXAMPLE 1

Preparation of Emulsifier

To a two liter flask having stirring means, a reflux condenser, temperature-control means, a nitrogen gas-introducing tube and a decanter were added 134 parts of N,N-bis(hydroxyethyl)taurine, 130 parts of neopentyl glycol, 236 parts of azelaic acid, 186 parts of phthalic anhydride, and 27 parts of xylene. The mixture was refluxed and water was removed as an azoetropic mixture with xylene. The temperature was raised to 190° C. over 2 hours and the reaction was continued with stirring until an acid number of 145 was reached.

The reaction product was cooled to 140° C. and 314 parts of CARDURA E-10(glycidyl versatate, Shell Chemical Company) was added dropwise over 30 minutes at 140° C. The reaction was continued for additional two hours with stirring. A polyester resin having an acid number of 59, a hydroxyl number of 90 and a number average molecular weight ($\overline{Mn}$) of 1054 was obtained.

EXAMPLE 2

Preparation of Emulsifier

A flask used in Example 1 was charged with 73.5 parts of sodium taurinate, 100 parts of ethylene glycol, and 200 parts of ethylene glycol monomethyl ether. The temperature was raised to 120° C. with stirring to give a uniform solution. To the solution was added with stirring a solution of 470 parts of EPIKOTE 1001 (Shell Chemical Company, bisphenol A diglycidyl ether epoxy resin having an epoxy equivalent of 70) in 400 parts of ethylene glycol monomethyl ether over hours. The mixture was stirred at the same temperature for additional 20 hours to complete the reaction. The reaction mixture was treated as in Example 1 above to give 518 parts of modified epoxy resin. The resin had an acid number of 9.4 (KOH titration) and a sulfur content of 2.8% (X-ray fluorometry).

EXAMPLE 3

Preparation of Polymer Microparticles

To a one liter flask equipped with stirring means, cooling means and temperature-control means were added 270 parts of deionized water, 40 parts of the emulsifier resin prepared in Example 1 and 3 parts of dimethylethanolamine. The mixture was stirred at 80° C. to make a solution. To the solution was added a solution of 4.5 parts of azobiscyanovaleric acid in 45 parts of deionized water containing 4.3 parts of dimethylethanolamine. Then a monomer mixture consisting of 70 parts of styrene, 65 parts of methyl methacrylate, 90 parts of butyl acrylate, 5 parts of 2-hydroxyethyl acrylate and 15 parts of ethyleneglycol dimethacrylate was added dropwise over 60 minutes. After the addition of monomer mixture, a solution of 1.5 parts of azobiscyanovaleric acid in 15 parts of deionized water containing 1.4 parts of dimethylethanolamine was added. The mixture was stirred for additional 60 minutes at 80° C. to give an aqueous dispersion of polymer microparticles having a pH of 7.2, a nonvolatile content of 39.5% and a particle size of 55 millimicrons.

EXAMPLE 4

Preparation of Polymer Microparticles

To a one liter flask equipped with stirring means, cooling means and temperature-control means were added 380 parts of deionized water, 50 parts of the emulsifier resin prepared in Example 2 and 7 parts of dimethylethanolamine. The mixture was stirred at 80° C. to make a solution. To the solution was added a solution of 2.5 parts of azobiscyanovaleric acid in 50 parts of water containing 1.6 parts of dimethylethanolamine. Then a monomer mixture consisting of 50 parts of styrene, 45 parts of ethyleneglycol dimethacrylate, 50 parts of methyl methacrylate, 5 parts of acrylic acid and 4 parts of dimethylethanolamine was added dropwise over 90 minutes. Stirring was continued for additional 90 minutes to give a polymer microparticle dispersion having a pH of 7.5, a nonvolatile content of 36% and an average particles size of 65 millimicrons. Polymer microparticles were obtained by spray drying the resulting polymer dispersion.

EXAMPLE 5

Preparation of Polymer Microparticles

To the same flask as used in Example 3 were added 370 parts of deionized water and 0.5 parts of AN-NITOL 24B (lauryl betaine sold by Kao Soap Co., Ltd.). The mixture was maintained at 70° C. to make a solution. To the solution was added a mixture of 50 parts of methyl methacrylate, 15 parts of dimethylaminoethyl methacrylate, 40 parts of styrene, 30 parts of ethyleneglycol dimethacrylate, 90 parts of n-butyl acrylate and 5 parts of 2-hydroxyethyl acrylate, and a solution of 4 parts of N-(3-phosphopropyl)-N-methacryloyloxyethyl-N,N-dimethylammonium betain and 2 parts of a polymerization initiator sold by Wako Junyaku Co., Ltd. under the trade name of V-50 (chemically 2,2'-azobis-2-amidinopropane) dissolved in 50 parts of deionized water over 2 hours. After the addition, the reaction mixture was maintained at 70° C. for 2 hours. A dispersion of polymer microparticles having a nonvolatile content of 35.5% and a particle size of 0.2 microns was obtained.

EXAMPLE 6

Preparation of Polymer Microparticles 370 parts of deionized water were placed in the same flask as used in Example 3 and heated to 70° C. To this were added two fifth of a solution of 5 parts of initiator V-50 in 50 parts of deionized water and also one tenth of a monomer mixture consisting of 50 parts of styrene, 30 parts of methyl methacrylate, 20 parts of divinylbenzene, 15 parts of 2-hydroxyethyl acrylate and 35 parts of n-butyl acrylate. After standing for 20 minutes at 70° C., the remaining portions of the initiator solution and the monomer mixture were added over 2 hours. A polymer microparticle dispersion having a nonvolatile content of 26.5% and a particle size of 0.4 microns was produced. To the dispersion was added a solution of 10 parts of the emulsifier resin produced in Example 1 and 0.5 parts of dimethylethanolamine.

EXAMPLE 7

Production of Cationic Resin 1,000 g of EPIKOTE 1004 (Shell Chemical Company, bisphenol diglycidyl ether epoxy resin) were dissolved in 300 parts of xylene, heated to 100° C. with stirring and allowed to cool in the atmosphere of nitrogen gas. To the solution were added 78.2 parts of diethylamine. The mixture was kept at a temperature of 100° C. for 2 hours and then heated further to remove xylene. 188.1 parts of pelargonic acid were added to the mixture and reacted at 200° C. under reflux for 5 hours. After the completion of the reaction, the reaction system was purged with an inert gas at 200° C. for 15 minutes and cooled to give a modified epoxy resin.

As a separate process, 174 parts of toluylenediisocyanate (80:20 mixture of 2,4- and 2,6-isomers) were reacted with 118 parts of ethyleneglycol monobutyl ether while maintaining the reaction temperature below 50° C. to produce half-blocked toluylenediisocyanate. Then 668 parts of glycerine-ethylene oxide-propylene oxide adduct (M.W.=2,000, OH equivalent=84) were reacted at 121° C. for 90 minutes. It was confirmed IR spectrometrically that all isocyanato groups were consumed. The reaction product was diluted with 411 parts of ethyleneglycol monomethyl ether.

EXAMPLE 8

Preparation of Polymer Microparticles for Comparison Purposes

The procedure of Example 3 was repeated except that 4 parts sodium lauryl sulfate were replaced for 40 parts of the amphoionic surfactant produced in Example 1 and 3 parts of dimethylamine. A dispersion of polymer microparticles having a nonvolatile content of 36.1%, a pH of 7.8 and a particle size of 155 millimicrons was obtained.

EXAMPLE 9

Preparation of Polymer Microparticles for Comparison Purposes

The procedure of Example 4 was repeated except that a mixture of 15 parts of styrene, 15 parts of methyl methacrylate and 15 parts of n-butyl acrylate was replaced for 45 parts of ethyleneglycol dimethacrylate. A dispersion of polymer microparticles having a nonvolatile content of 36%, a pH of 7.5 and a particle size of 75 millimicrons was obtained. This dispersion was spray dried to obtain dry microparticles.

EXAMPLE 10

100 parts of an anionic electrodeposition resin derived from Chinese tung oil and maleic anhydride (acid number=105, nonvolatile content=100%, average M.W.=2,500) were neutralized with 40% equivalent of dimethylethanolamine and dissolved in 400 parts of deionized water. 20 parts of polymer microparticles dispersion prepared in Example 3 were thoroughly mixed with the solution to give an anodic electrodeposition coating composition having a conductivity of 2.5 mS/cm. After standing for one month, no settlement of the polymer microparticles was observed.

This composition was electrodeposited on a zinc phosphate-treated steel plate at 20° C. at 200 volt. A uniform coating film was obtained. When baking at 170° C. for 30 minutes, the film had a thickness of 42 microns and a pencil hardness H. When testing for impact strength using a Du Pont impact tester, no crack or peeling was observed upto 500 g×50 cm.

COMPARATIVE EXAMPLE 1

An electrodeposition coating composition was prepared as in Example 10 except that the polymer microparticle dispersion of Example 3 was not added at all. The resulting electrodeposited film had a thickness of 27 microns and a pencil hardness H after baking. In the same impact strength test using the Du Pont impact tester, no crack or peeling occurred upto 500 g×35 cm.

Thus, the composition of this Comparative Example was inferior to the composition of Example 10 in terms of film thickness and physical properties.

COMPARATIVE EXAMPLE 2

An electrodeposition coating composition was prepared as in Example 10 except that 21.9 parts of the polymer microparticle dispersion of Example 8 were replaced for the polymer microparticle dispersion of Example 3. Settlement of some polymer microparticles was observed when the composition was allowed to stand for one month.

Electrodeposition of this composition onto a zinc phosphate-treated steel plate failed to give a uniform coating film.

EXAMPLE 11

100 parts of an anionic electrodeposition resin produced from polybutadiene, Chinese tung oil and maleic anhydride (acid number=110, nonvolatile content=85%, average M.W.=2,400) were thoroughly mixed with 15 parts of the dry polymer microparticles of Example 4, neutralized with 35% equivalent of dimethylethanolamine and gradually dissolved in 400 parts of deionized water to give an anodic electrodeposition coating composition having a conductivity of 2.4 mS/cm. This composition remained stable for one month without settling of the polymer microparticles.

This composition was tested for its throwing power by the pipe test method at 20° C. at 150 volt and gave a value of 21cm. In the similar electrodeposition to the preceding examples, the composition gave a film thickness of 38 microns after baking. Thus, the composition demonstrated an excellent workability including throwing power.

COMPARATIVE EXAMPLE 3

An electrodeposition coating composition was prepared as in Example 11 except that 15 parts of the dry polymer microparticles of Example 9 were replaced for the dry polymer microparticles of Example 4.

The resulting composition was not sufficiently stable and settling of some microparticles was observed after storing for one month.

The pipe test method performed as Example 11 gave a throwing power of 11 cm.

EXAMPLE 12

500 parts of the modified epoxy resin and 285 parts of the blocked polyisocyanate composition both produced in Example 7 were dissolved together in 2,000 parts of deionized water containing 19 parts of glacial acetic acid. To this were added 50 parts of the polymer microparticle dispersion of Example 5 to obtain a cathodic electrodeposition coating composition having a conductivity of 1.3 mS/cm. The polymer microparticles had not settled at all after standing for one month.

The composition was electrodeposited cathodically on a zinc phosphate-treated steel plate at 20° C. at 200 volt for minutes and baked at 180° C. for 30 minutes. A smooth, hard and flexible coating film was obtained.

EXAMPLE 13

Into the coating composition of Example 12 were uniformly dispersed 20 parts of a pigment paste comprising a 1:1 mixture of lead oxide and strontium chromate. The cured electrodeposition film of this composition prepared as in Example 12 showed excellent corrosion resistance when subjecting to the standard salt spray test for 400 hours.

EXAMPLE 14

The procedure of Example 12 was repeated except that 70 parts of the polymer microparticles dispersion of Example 6 were replaced for 50 parts of the polymer microparticle dispersion of Example 3. No settling of the polymer microparticle was observed upon standing for one month.

The composition showed an excellent throwing power and gave a film thickness of 35 microns.

EXAMPLE 15

150 parts of the modified epoxy resin produced in Example 7 was blended with 30 parts of methoxylated methylol melamine resin and 10 parts the polymer microparticle dispersion of Example 3. The mixture was neutralized with acetic acid and dispersed in deionized water to a suitable solid content.

The electrodeposition film formed on a zinc phosphate-treated steel plate had a pencil hardness 2H after baking at 130° C. for 30 minutes.

COMPARATIVE EXAMPLE 4

The procedure of Example 15 was followed without adding the polymer microparticle dispersion of Example 3. The resulting composition gave a cured film having a pencil hardness F and thus demonstrated a decreased curing property

We claim:

1. In a method for coating an electrically conductive substrate comprising the steps of connecting said substrate to a DC current source as an electrode, immersing said substrate and a counter-electrode in an electrocoating bath containing an electrically depositable coating composition, supplying a DC current between said substrate and the counter-electrode in said electrocoating bath to form a film of said coating composition on said substrate, removing said substrate from said bath, and curing said film, the improvement wherein said electrically depositable coating composition comprises:
   (a) an aqueous dispersion of an at least 20% neutralized, acid or base function-bearing electrically depositable binder resin which is neither soluble nor dispersible in water in its unneutralized form and which is water-soluble or water-dispersible in an at least 20% neutralized form, and
   (b) 0.1 to 120 parts by weight per 100 parts by weight of said electrically depositable resin of water-insoluble, internally crosslinked polymer microparticles uniformly dispersed in said aqueous dispersion, said polymer microparticles having a particle size from 0.01 to 2 microns and bearing on their surfaces physically adhered or covalently bonded thereto an amphoionic group of the formula:

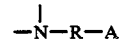

wherein R represents an unsubstituted or substituted $C_1$–$C_6$ alkylene or phenylene, and A represents —COOH or —$SO_3H$, said composition having an electroconductivity of 0.1 to 5 mS/cm.

2. A method of claim 1, wherein said polymer microparticles further bear on their surfaces an additional ionic group having the same polarity as the polarity of said electrically depositable resin.

3. A method of claim 1, wherein said electrically depositable resin is a carboxyl group-containing resin derived from acrylic, polyester, polyether, phenolic, epoxy, polyurethane, polyamide, polybutadiene or oil based resin.

4. A method of claim 1, wherein said electrically depositable resin is a resin having an amine moiety derived from epoxy, polyether, polyester, polyurethane, polyamide, polybutadiene, phenolic or acrylic resin.

5. A method of claim 1, wherein said polymer microparticles are prepared by polymerizing a monomer mixture consisting of 1 to 100% by weight of an ethylenically unsaturated polyfunctional monomer and 0 to 99% by weight of an ethylenically unsaturated monofunctional monomer, or a mixture of two monomers having mutually reactive groups.

6. A method of claim 5, wherein said monomer mixture is polymerized in the presence of a surfactant, monomer, oligomer or polymer having said amphoionic group.

7. A method of claim 6, wherein said monomer or oligomer has an ethylenically unsaturated function and is covalently bound to said polymer microparticles through copolymerization with said monomer mixture.

8. A method of claim 6, wherein said surfactant, oligomer or polymer is physically adhered to the surfaces of said polymer microparticles.

9. A method of claim 5, wherein said polymer microparticles are coated with an oligomer or polymer having said amphoionic group.

10. A method of claim 5, wherein said monomer mixture is polymerized by the emulsion, NAD or precipitation polymerization method.

11. A method of claim 1, wherein the electrodeposition coating composition has an electroconductivity of 0.5 to 3 mS/cm.

12. A method of claim 1, wherein the electrodeposition coating composition has a nonvolatile content of 10 to 20% by weight.

13. A method of claim 1, wherein the electrodeposition coating composition is pigmented.

14. A method of claim 1, wherein the electrodeposition coating composition is pigmented and wherein the resin is 35–40% neutralized.

15. A method of claim 1, wherein the electrodeposition coating composition is anionic and pigmented and which contains an amount of base effective to at least 20% neutralize the resin.

16. A method of claim 1, wherein the electrodeposition coating composition is cationic and pigmented and which contains an amount of acid effective to at least 20% neutralize the resin.

* * * * *